United States Patent [19]

Kaspar

[11] Patent Number: 4,936,671
[45] Date of Patent: Jun. 26, 1990

[54] OUTSIDE REAR-VIEW MIRROR FOR A MOTOR VEHICLE HAVING A REVERSE GEAR

[76] Inventor: Rudolf Kaspar, Ringstrasse 30, 6981 Collenberg, Fed. Rep. of Germany

[21] Appl. No.: 363,781

[22] Filed: Jun. 9, 1989

[30] Foreign Application Priority Data

Jun. 9, 1988 [DE] Fed. Rep. of Germany ....... 3819597
Jan. 19, 1989 [DE] Fed. Rep. of Germany ....... 3901442

[51] Int. Cl.$^5$ ................................................ G02B 5/08
[52] U.S. Cl. ..................................... 350/637; 350/606; 350/632
[58] Field of Search ............... 350/632, 634, 636, 637, 350/606; 248/479, 486

[56] References Cited

U.S. PATENT DOCUMENTS 2,871,761 2/1959 Snyder ..................... 350/637

FOREIGN PATENT DOCUMENTS 57-144145 9/1982 Japan ..................... 350/637
58-224826 12/1983 Japan ..................... 350/637

Primary Examiner—Bruce Y. Arnold
Assistant Examiner—J. Ryan
Attorney, Agent, or Firm—Fleit, Jacobson, Cohn, Price, Holman & Stern

[57] ABSTRACT

Disclosed is an outside rear-view mirror for a motor vehicle having a reverse gear. The outside rear-view mirror comprises a mirror housing adapted for being mounted to a body of the vehicle. A mirror glass is held by the mirror housing and a drive motor is provided for tilting the mirror glass about at least one axis with respect to the vehicle. The mirror is coupled to the drive motor through a link. A current supply circuit for the drive motor is provided and includes a reverse switch for reverting the direction of rotation of a rotor of the drive motor. A control member for switching the reverse gear is coupled to the reverse switch and to a preset displacement restricting device for restricting a rotation of the link. The displacement restricting device may be controlled electro-mechanically or may be formed electronically. Thereby, an inexpensive parking aid is presented to the driver which allows a view on the rearward portions of the car as an aid for rearwardly maneuvering the car into a parking space.

14 Claims, 3 Drawing Sheets

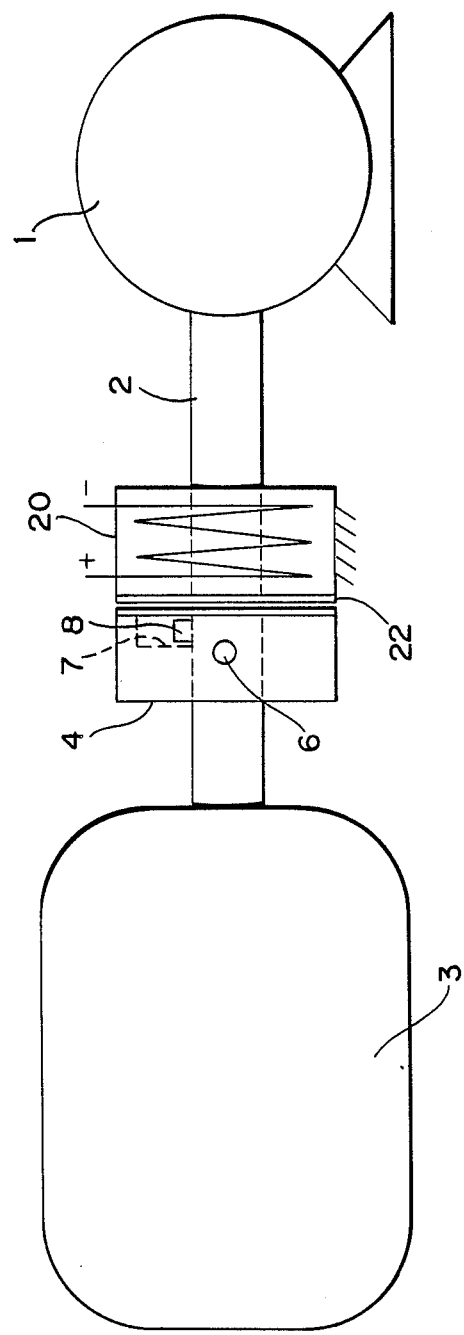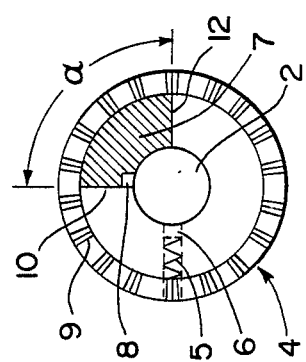

OUTSIDE REAR-VIEW MIRROR FOR A MOTOR VEHICLE HAVING A REVERSE GEAR

BACKGROUND OF THE INVENTION

1. Field of the Invention

The invention refers to an outside rear-view mirror for a motor vehicle having a reverse gear. The outside rear-view mirror comprises a mirror housing adapted for being mounted to a body of the vehicle. A mirror glass is held by the mirror housing and a drive motor is provided for tilting the mirror glass about at least one axis with respect to the vehicle.

2. Background of the Invention

An outside rear-view mirror for a vehicle is disclosed in published German Patent Application No. 2,715,575 in the mirror housing of which a drive motor for tilting a mirror glass is mounted. The drive motor is coupled to the mirror glass by a reduction gear which allows tilting the mirror glass about an axis when the drive motor is activated. The axis extends substantially horizontally, if the outside rear-view mirror is fastened to the body of the car. The drive motor may be activated by manipulating a switch by the driver over a period of time until the mirror glass has assumed a position in good adjustment to the seating position of the driver.

For cars having left hand drive an additional outside rear-view mirror is commonly mounted to the right side of the car body for allowing the driver a view on what is happening on the right side behind his car, particularly during overtaking.

The driver's particular skill is necessary when maneuvering the vehicle rearwardly into a parking space between two cars in a lane, particularly in situations, when the parking space is limited laterally by an elevated curb stone, a post or similar impediments not visible to the driver. So far, the driver of cars having left-hand drive has no view on the right rearward end of his car because the right-hand outside rear-view mirror is misadjusted for such purpose. Thus, the driver has to readjust manually his right hand outside rear-view mirror such that he may obtain a view on the situation proximate to the rearward right-hand portion of his car.

Such readjustment of the right-hand outside rear-view mirror therefore requires a specific manipulation by the driver, which is inconvenient as the position of the outside rear-view mirror on the car body is normally outside the range of the driver's hands. Therefore, he has to leave his driving position for carrying out such readjustment. Moreover, such readjustment creates the risk that the driver misses to return the mirror glass of the outside rear-view mirror to a normal driving position when he continues to run the car forwardly. Therefore, an adjustment of the mirror glass to a situation of maneuvering the car rearwardly into a parking space inherently creates a safety problem after again starting the car.

SUMMARY OF THE INVENTION

It is therefore an object of the invention to devise an outside rear-view mirror for a car having a reverse gear which offers to the driver a complete and clear view on the lower rearward portions of his car during rearwardly maneuvering the car into a parking space. Such outside rear-view mirror still should present to the driver an efficient rear-view during normal driving conditions without specific manipulations. An improved outside rear-view mirror should avoid any safety problems stemming from a utilization of the rear-view mirror for parking purposes.

To this end the invention provides for an outside rear-view mirror for a motor vehicle having a reverse gear. The outside rear view mirror comprises a mirror housing adapted for being mounted to a body of the vehicle. A mirror glass is held by the mirror housing and a drive motor is coupled to the mirror glass through a link. A current supply circuit for the drive motor includes a reverse switch for reversing the rotation of the drive motor. A control stick for the reverse gear is coupled to the reverse switch for switching and is coupled to a preset displacement restriction device for the rotations of the link. Thereby the driver is relieved from a particular manipulation of the mirror glass to a tilted position allowing the desired view to the right rearward end of his car. When changing into the rearward gear, the mirror glass assumes automatically the desired tilted position and returns to the initial position automatically, when the rearward gear is taken out because the drive motor is caused to inverse rotation. Moreover, the preset displacement restricting device may be realized electronically or electromagnetically by components of low price level so that manufacturing and building in of the parking aid according to the invention are inexpensive.

According to an improvement of the invention, the displacement restricting device comprises an electromagnetic clutch suitable to be operated by a control stick and including two coupling members. Preferably, one of the coupling members has an axially extending nose projecting into a recess formed in the other coupling member when the clutch is operated. The link then may be rotated by the activated drive motor only to such extent as the nose is free to move within the recess.

According to a further preferred embodiment of the invention, a plate-like coupling member is elastically mounted to the link and is provided with a recessed sector into which a radial nose of the link extends. In case the other fixed coupling member is activated, it grasps and holds the plate-like coupling member to the effect that the radial nose has only limited possibility of displacement within the recessed sector.

The link may have the form of the driving shaft of the drive motor itself or may be a shaft extending from a reduction gear coupled to the drive motor.

According to yet another preferred embodiment of the invention, an electronic displacement restricting device includes a preset counter for counting pulses generated by the commutator of the direct current drive motor, starting from an initial count to a preset maximum counter reading. If the maximum counter reading is reached, the counter applies an inhibit signal for inhibiting further flow of current to the drive motor. This embodiment of the invention includes only few inexpensive electronic components and presents highly reliable performance and resistance to wear. The maximum counter reading may be preset on the production line of the device such that the mirror glass may tilt sufficiently for obtaining the desired parking aid.

BRIEF DESCRIPTION OF THE DRAWINGS

The invention is disclosed hereinafter in preferred embodiments with reference to the accompanied drawings. From the drawings show:

FIG. 1 a schematic representation for explaining the functional mode of a first embodiment of a drive means for tilting a mirror glass of an outside rear-view mirror;

FIG. 2 a schematic front view of the apparatus according to FIG. 1;

DESCRIPTION OF THE PREFERRED EMBODIMENTS

Figure 3:
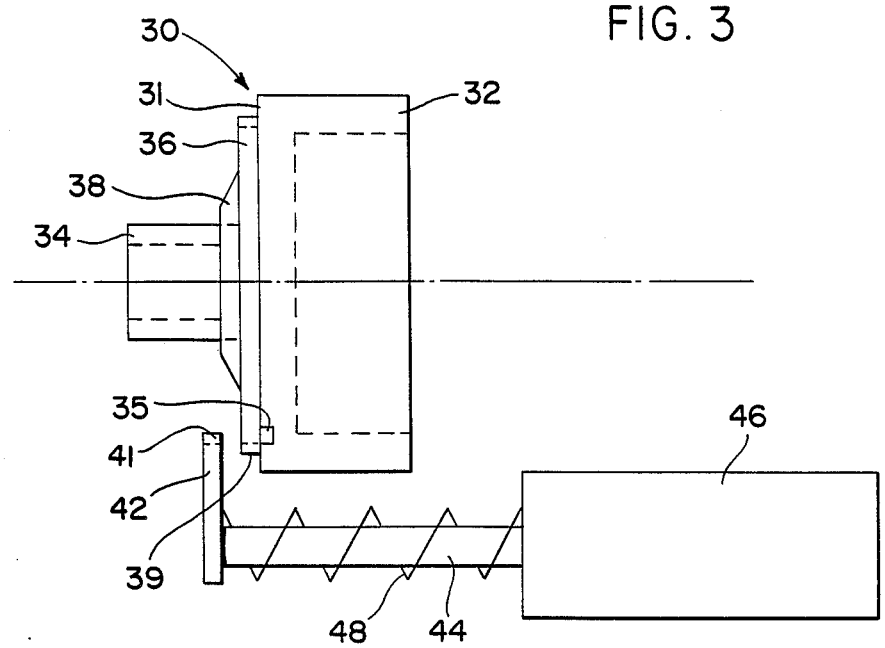
FIG. 3 a schematic representation of the functional mode of another embodiment of the drive means for the mirror glass according to FIG. 1.

The invention is particularly suitable for being utilized and built in into an outside rear-view mirror of a car, examples of which are specifically disclosed in U.S. Pat. Nos. 2,822,681 or 3,226,435. The disclosures of both papers are included herein by reference thereto. Accordingly, for carrying out the invention it is not important whether the mirror glass is mounted fixedly to a mirror housing as disclosed in German Pat. Specification No. 2,822,681 and whether the module comprising the mirror glass and the mirror housing is adjustable electrically relative to a mirror base mounted to a car body by the drive motor by corresponding manipulations in the interior of the car, or whether the mirror glass is mounted to the mirror housing so as to be adjustable by the drive motor relative to the mirror housing which may be folded rearwardly or forwardly according to German Pat. Specification 3,226,435.

A drive motor 1 according to FIG. 1 may represent the direct current drive motor 11 disclosed in German Pat. Specification 2,822,681 or the motor 40.2 according to German Pat. Specification 3,226,435. The drive motor 1 is coupled to a link 2 which may be the drive shaft of the drive motor. A mirror glass 3 illustrated only schematically is coupled to the link 2, so as to be tilted about a not-shown axis by link 2 rotating when the drive motor is activated. Such axis extends substantially horizontally and transverse to the forward drive direction when the not-shown mirror housing comprising mirror glass 3 is mounted to a car body.

A cylindric plate 4 has a central axial bore, through which link 2 extends. Moreover, a radial bore is drilled into plate 4 for accommodating a spring 5 which urges a ball 6 against the periphery of link 2. The outer end of helical spring 5 abuts a counter screw held in the internal thread of the radial bore. In the embodiment according to FIG. 2, the periphery of the rod-like link 2 is provided with a shallow recess for accommodating a portion of ball 6. Thereby, the plate 4 is coupled to link 2 and both parts rotate commonly when the drive motor 1 is activated.

In the plate 4 a sector 7 is recessed illustrated by hatching in FIG. 2. A radially protruding nose 8 of link 2 is caught within the recess 7. The recess 7 extends radially from the central bore of plate 4 until a geared rim 9 of plate 4, which extends transversely to link 2. In circumferential direction recess 7 extends over an angle alpha mentioned specifically below.

The casing of the drive motor 1 is fixedly mounted to a not-shown support structure to which also a trip-coil magnet 20 is mounted. The trip-coil magnet 20 has a central opening through which link 2 extends. The trip-coil magnet 20 is mounted such that an endface 22 thereof having a geared rim 22 faces closely the geared rim 9 of plate 4 as shown in FIG. 1. Thus, when the coil of the trip-coil magnet 20 is activated, it draws plate 4 axially along link 2 such that geared rim 9 engages correspondingly geared rim 22 of the opposing endface of trip-coil magnet 20. For such engagement ball 6 may escape at least partially the shallow recess of link 2. The so far described apparatus may work as follows:

The mirror glass 3 may be mounted in an outside rear-view mirror fixed to the right front door of a car having left hand drive. The driver may wish to push a not-shown switch arranged in the cockpit of the car for activating the drive motor 1 such, that mirror glass 3 will assume a position which is adjusted to the seating position of the driver and presents a view to the rear of the right side of the car. The activated drive motor 1 causes link 2 to rotate. Plate 4 follows such rotation without slippage because of the engagement of the spring loaded ball 6 with the recess of link 2. Nose 8 abuts a limiting endface 10 of recess 7. The abutment of nose 8 to endface 10 is maintained during rotation of link 2 in counterclockwise direction according to the illustration of FIG. 2. However, such abutment is also maintained during rotation of link 2 in clockwise direction because the helical spring 5 may develop a sufficient force for coupling the plate 4 to link 2 for the mentioned operational conditions. If the driver will wish to park his car by rearwardly maneuvering his car into a parking space, he will shift into the rearward gear of his car. Thereby a current supply circuit not shown for the trip-coil magnet 20 is closed. The attracting force of the activated trip-coil magnet 20 draws plate 4 axially along link 2 until the geared rim 9 engages the geared rim 22. The attracting force is of such extent, that the ball 6 leaves its stable position within the recess of link 2. It should be noted, that the axial depth of sector 7 allows such axial movement of plate 4 relative to nose 8. By engagement of geared rims 9 and 22 the plate 4 is slipfree coupled to trip-coil magnet 20, and therefore plate 4 no longer can rotate with rotating link 2. When switching into the rearward gear also drive motor 1 is activated so that link 2 is caused to rotate in a direction which leads to a downward tilting of mirror glass 3. Such rotation of link 2 causes nose 8 to move angularly within sector 7 until it abuts a limiting endface 12 angularly opposite to endface 10 of sector 7! The drive motor normally is equipped with a friction clutch not shown between the drive shaft thereof and link 2. Therefore, when link 2 is prevented from further rotation by abutment of nose 8 against limiting endface 12, the drive shaft still may continue to rotate for a short time until safety means of the drive motor 1 cause an interruption of further supply of current to motor 1. Such safety means may include a timer which allows flow of current through drive motor 1 for a period of time which is slightly longer than the period needed for transferring nose 8 from endface 10 to endface 12. Thus, when nose 8 abuts limiting endface 12 of sector 7 the mirror glass 3 is tilted downwardly to such extent that the driver is offered a complete and sufficient view to the right-hand rear wheel and the associated rearward portions of his car for obtaining the possibility to note any impediments of the road which his car has to come around when finding the proper parking position. Such impediments may be formed by elevated curbstones or posts which otherwise are outside the view of the driver. It is to be noted that shortly after the drive motor is deactivated also the trip-coil magnet 20 is deactivated.

If the driver manipulates the control stick of his car such that the rearward gear is released, the drive motor 1 is again activated for a predetermined period of time and caused to rotate in a direction which is opposite to the direction of rotation caused by switching in the rearward gear. Again, the trip-coil magnet 20 is activated. Thus, link 2 also is caused to rotate. Therefore, nose 8 which still abuts endface 12 moves through sector 7 together with the rotating link 2 until abutment against limiting endface 10 which terminates further rotation of link 2 in a counterclockwise direction according to Fig! 2. By such limited rotation of link 2 the mirror glass 3 is transferred from the downward tilted position for forming a parking aid to the initial position thereof suitable for presenting a view of the traffic situation right hand rearwardly of the car. As explained above, upon expiration of the timer the activation of drive motor 1 will cease and trip-coil magnet 20 will be deactivated. Under the influence coil spring 5, ball 6 will find its way into the stable position thereof within the peripheral recess of link 2 to the effect that geared rims 9 and 22 will disengage. Thus, plate 4 now may rotate together with link 2 in either directions.

Figure 4:
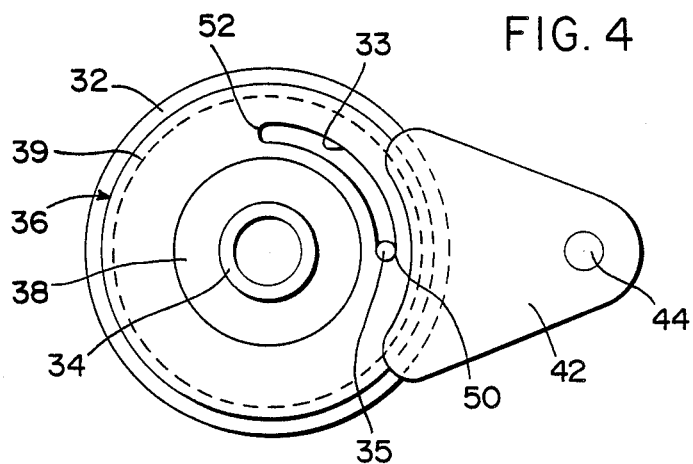
FIG. 4 a schematic representation of a front view of the apparatus according to FIG. 3.

Another embodiment of the invention is shown in FIGS. 3 and 4. A reduction gear generally designated by the reference numeral 30 is coupled to the drive shaft of the not-shown drive motor in a not-shown manner. A first portion of the gear 30 comprises a cylindric cage internally geared from the base of which a stem 34 of smaller diameter protrudes outwardly, the stem having a geared end. A circular plate 36 is clamped rotatably to stem 34 and urged towards the outwardly facing end surface 31 of cage 32 by a spring ring 38. The stem 34 extends through an axial bore of plate 36. The spring ring 38 may abut, opposite to plate 36, against a not-shown shoulder of stem 34 not-shown. The plate 36 is provided with an axially extending nose 35 which is accommodated within a curved slot 33 cut into the endface 31 of the base of cage 32, and which extends for an angle alpha about the axis of cage 32. The lateral periphery of plate 36 is provided with a gear 39 which may mesh with a gear 41 of a stop plate 42. The stop plate 42 is mounted to the free end of an unrotatable armature 44 of a magnet 46 and is urged outwardly of the magnet 46 by a helical spring 48. Thus, spring 48 normally holds the gear 41 of stop plate 42 out of engagement with gear 39 of plate 36.

The gear of stem 34 may mesh in not-shown manner with a corresponding gear mounted to the link according to FIG. 2. The magnet 46 is mounted to a not shown support structure. The gear of cage 32 may mesh with a corresponding gear mounted to the drive shaft of the not-shown drive motor.

The device according to the second embodiment of the invention works generally similar to the device according to the above illustrated first embodiment of the invention so that only the particular features of the second embodiment are explained hereinafter, and for the overall functional behavior reference is made to the explanation given for the first embodiment. If the mirror glass is to serve as a parking aid, the magnet 46 is activated when the reverse gear of the car is shifted in. With activated magnet 46 the stop plate 42 is drawn into the magnet 46 against the force developed by the spring 48 to such extent that the gear 41 engages gear 39. It is to be noted, that stop plate 42 is held unrotatably within the magnet 46. Therefore, plate 46 is prevented from any rotation together with reduction gear 30. If the drive motor now will be activated, plate 36 slips on the base of cage 32 and on stem 34 to the effect that nose 35 moves within and along slot 33 until it will abut endface 52 of slot 33 if the reduction gear 30 rotates clockwise according to FIG. 4. Upon abutment of nose 35 against endface 52 the reduction gear 30 is prevented from further rotation, and as explained above the drive motor will be deactivated thereafter. The angular extension alpha of slot 33 similar to the extension of sector 7 is selected such that when nose 35 abuts endsurface 52 (nose 8 abuts endface 12) the mirror glass assumes a downwardly tilted endposition in which the mirror glass is a parking aid to the driver.

When the rearward gear is switched off, the magnet 46 is again activated for holding plate 36 unrotatably. The nose 35 thereof is still abutting end face 52 of slot 33. Thereafter the drive motor is activated in opposite direction to the effect that reduction gear 30 rotates in counterclockwise direction (FIG. 4). Thus, slot 33 is moved past nose 35 until nose 35 abuts endface 50 of slot 33 which is angularly opposite to endface 52. The reduction gear 30 then is blocked from further rotation. Actually, the mirror glass coupled to the reduction gear 30 is tilted upwardly to the initial position thereof for presenting a rear view on the traffic situation behind the car on the right side thereof. The drive motor and the magnet 46 then are deactivated, and the complete device has assumed its initial position. Plate 36 then may rotate together with cage 30 and it is to be understood that the force developed by springring 38 unto plate 36 has such extent that nose 35 remains in abutment to endface 50 for all adjustments the driver would wish to make for the mirror glass during normal forward driving conditions.

It is within the invention disclosed herein that the described parking aid may be selectively put into operation by the driver. To this end a special switch may be provided in the cockpit of the driver which when being pushed initializes the disclosed parking aid devices to operation when the reverse gear is shifted in. Thereby, the driver may select utilization of the parking aid only in cases when shifting into reverse gear actually is intended for parking purposes so that selecting the reverse gear for different purposes the parking aid according to the invention may be switched out of service.

Moreover it is within the invention to provide for a delaying means which allows the trip-coil magnets 20 and magnet 46 and the associated drive motor to be activated after switching off the reverse gear only after a preset period of time has elapsed. Actually, when maneuvering rearwardly a car into a parking space, it is normal practice to often change the reverse gear for the lowest forward gear and vice versa. The delay means according to the invention prevents that the mirror glass once tilted into parking aid position follows such rapid changes. Instead the delay means ensures that the mirror glass maintains the downward tilted position during the complete parking maneuver.

Figure 5:
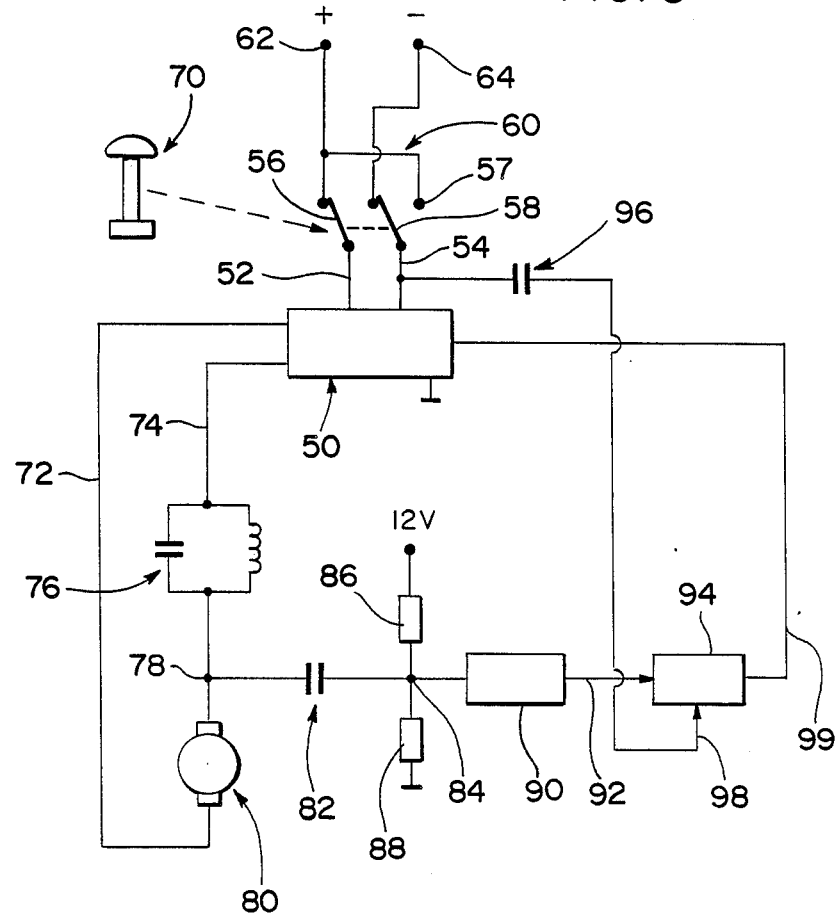
FIG. 5 a schematic electric diagram of yet another embodiment of a drive means for the mirror glass.

FIG. 5 shows yet another embodiment of the invention wherein the parking aid is controlled electronically. As shown a driver circuit 50 has input lines 52, 54 each of which is connected to a movable arm 56, 58 of a double throw reversing switch 60. One pair of fixed contacts of switch 60 is connected to a positive terminal 62 and a negative terminal 64, respectively, of the battery of the car. Another pair of normally open contacts 55, 57 is connected to the negative terminal 64 and the positive terminal 62, respectively. The coupled arms 56, 58 are functionally coupled to a control stick 70 of the gear box of the car. Thus, the input lines 52, 54 are normally connected to the positive terminal 62 and the negative terminal 64, respectively as long as the reverse gear is not switched in. In case control stick 70 is manipulated for switching in the reverse gear arms 56, 58 are thrown to the other pair of terminals 55, 57 to the effect that now input line 52, 54 are connected to the negative terminal 64 and the positive terminal, respectively.

Output lines 72, 74 of the driver circuit 50 are provided for supplying direct current to a drive motor 80. In the output line 74 an A.C. resistance network 56 comprising a parallel connection of a capacitor and an inductivity is connected as shown commonly, the direct current drive motor 80 is equipped with a commutator for feeding the current to different windings of the rotor of the motor. When the rotor is rotating the current flowing through the commutator is repeatedly interrupted for short periods of time; such interruptions generate reverse voltages on the current feeding line 74 for the motor 80 in view of the inherent inductivities of the circuit. Such voltages appear therefore also at connecting point 78 of line 74 provided between the commutator of motor 80 and the network 76. The network 76 forms a high resistance for said voltage-peaks so that said voltage-peaks may be taken over by the capacitor 82 connected to the connection point 78. The capacitor 82 opposite to the connecting point 78 of line 74 is connected to an input line 86 of a signal shaping unit 90. The input line 86 is connected through a connection 84 of two series resistors 86, 88 coupled between the positive voltage of +12 V of the battery of the car and ground. The signal shaping unit 90 forms from the voltage-peaks received trough capacitor 82 over input line 86 a series of separate pulses which are applied to a counter 94 through line 92 which is the output line of signal shaping unit 90 and input line to counter 94. Starting from an initial count the counter 94 counts the pulses received trough line 92 until a preset maximum reading is achieved when the counter 94 emits an inhibit signal to line 99. Said inhibit signal is fed to driver circuit 50. When the driver circuit 50 receives said inhibit signal the supply of current through output lines 72, 74 is inhibited. A capacitor 96 is coupled to input line 54 on one hand and to a reset input of counter 94 by line 98. If necessary, line 98 also may include a signal shaping unit for presenting proper reset signals for counter 94.

If the driver of the car switches the reverse gear by corresponding manipulation of the control stick 70 the arms 56, 58 are transferred to the second pair of contacts 55, 57 so that the input lines 52, 54 are connected to the negative terminal 64 and the positive terminal 62, respectively. Thereby a voltage-peak is produced which is utilized trough capacitor 96 as a reset signal for counter 94. Thus, the inhibit signal on line 99 disappears and the counter assumes its initial zero count. The motor 80 is supplied by current through lines 72, 74 to the effect that the rotor thereof starts rotating. The signal peaks generated at the commutator thereof are counted by counter 94, and the motor 80 runs until the counter reaches the preset maximum reading thereof. The inhibit signal then generated on line 99 blocks further supply of current to the motor 80 which ceases rotating.

It is to be understood that the motor 80 is coupled to the mirror glass as specifically disclosed above for the first and second embodiments of the invention. Thus, the maximum counter reading is selected such that during rotation of the rotor of motor 80 the mirror glass is tilted from the position adjusted to the normal forward driving condition of the car to the parking aid position as explained herein above.

If the control stick 70 is transferred from the reverse gear to another gear the arms 56, 58 of switch 60 throw to the first pair of contacts and are therefore connected to the terminals 62 and 64, respectively. Thereby a reset signal is generated which is transferred to the reset input of counter 94 through capacitor 96 and line 98. The counter is reset and does no longer emit the inhibit signal. Thus, driver circuit 50 is free to supply current through lines 72, 74 to motor 80 in a reverse polarity so that the rotor of motor 80 now rotates in opposite direction. Nevertheless, voltage-peaks are generated at the commutator of motor 80 which are reversed and formed by unit 90 and counted by counter 94. Again, when counter 94 reaches the preset maximum reading it generates an inhibit signal received by driver circuit 50 trough line 99 for inhibiting further supply of current to motor 80. It is to be understood that the mirror glass now is transferred from the downward tilted parking aid position to the initial position thereof for normal forward drive condition. Presetting of the maximum counter reading may be made when assembling the circuit and the components therefor. The actual maximum counter reading may be selected in consideration of the dimension of the car for which the outside rear-view mirror according to the invention is to be utilized.

What is claimed is:

1. Outside rear-view mirror for a motor vehicle having a reverse gear comprising
    a mirror housing mounted to the vehicle and holding a mirror glass,
    the mirror glass adapted to be adjusted about an axis and being coupled to a drive motor through a link,
    a current supply circuit being provided for the drive motor which includes a reverse switch for reverting the rotational direction of a rotor of the motor,
    wherein a control element for switching the reverse gear is coupled to the reverse switch and to a preset displacement restricting device for limiting a rotation of the link.

2. Outside rear-view mirror according to claim 1 wherein the displacement restricting device includes an electro-magnetic clutch adapted to be activated by the control member and having two coupling members.

3. Outside rear-view mirror according to claim 2 wherein one of the coupling members is provided with an axially extending nose engaging a recess of the other coupling member when the clutch is activated.

4. Outside rear-view mirror according to claim 3 wherein the recess is curved.

5. Outside rear-view mirror according to claim 3 wherein a trip-coil magnet is provided having an armature for locking a coupling member from rotation when the trip-coil magnet is activated which coupling member follows a rotation of link when the trip-coil magnet is deactivated.

6. Outside rear-view mirror according to claim 2 wherein a trip-coil magnet is provided having an armature for locking a coupling member from rotation when the trip-coil magnet is activated which coupling member follows a rotation of link when the trip-coil magnet is deactivated.

7. Outside rear-view mirror according to claim 2 wherein a first plate-like coupling member is mounted resiliently to the link and is provided with a profiled ring such as a peripheral gear into which a counter profile of a stop element may engage when the clutch is activated.

8. Outside rear-view mirror according to claim 1 wherein the link is a drive shaft of the drive motor.

9. Outside rear-view mirror according to claim 1 wherein the link is part of a reduction gear which is coupled to the drive motor and to the mirror glass.

10. Outside rear-view mirror according to claim 1 wherein voltage-peaks generated by a commutator of the direct current drive motor are shaped to impulses which are counted by a counter which when arriving at a preset maximum reading produces an inhibit signal for inhibiting further supply of current to the motor.

11. Outside rear-view mirror according to claim 10 wherein an A.C. resistance network is coupled into current supply lines for the motor and wherein the voltage-peaks are taken over from a line connecting the A.C. resistance network and the commutator.

12. Outside rear-view mirror according to claim 11 wherein voltage-peaks generated in the reverse switch when switching are fed to the counter as reset pulses.

13. Outside rear-view mirror according to claim 10 wherein voltage-peaks generated in the reverse switch when switching are fed to the counter as reset pulses.

14. Outside rear-view mirror according to claim 10 wherein the maximum reading is selected such that the link may rotate for tilting the mirror glass from a position adjusted to normal forward drive of the car to a position forming a parking aid and vice versa.

* * * * *

UNITED STATES PATENT AND TRADEMARK OFFICE
CERTIFICATE OF CORRECTION

PATENT NO. : 4,936,671
DATED : June 26, 1990
INVENTOR(S) : Rudolf KASPAR

It is certified that error appears in the above-identified patent and that said Letters Patent is hereby corrected as shown below:

On the title page, before "[21] Appl. No.: 363,781", please add:
--[73] Assignee: Hohe KG, Haupstrasse, Germany--

Signed and Sealed this

Second Day of March, 1993

Attest:

STEPHEN G. KUNIN

Attesting Officer

Acting Commissioner of Patents and Trademarks